United States Patent Office 3,523,066
Patented Aug. 4, 1970

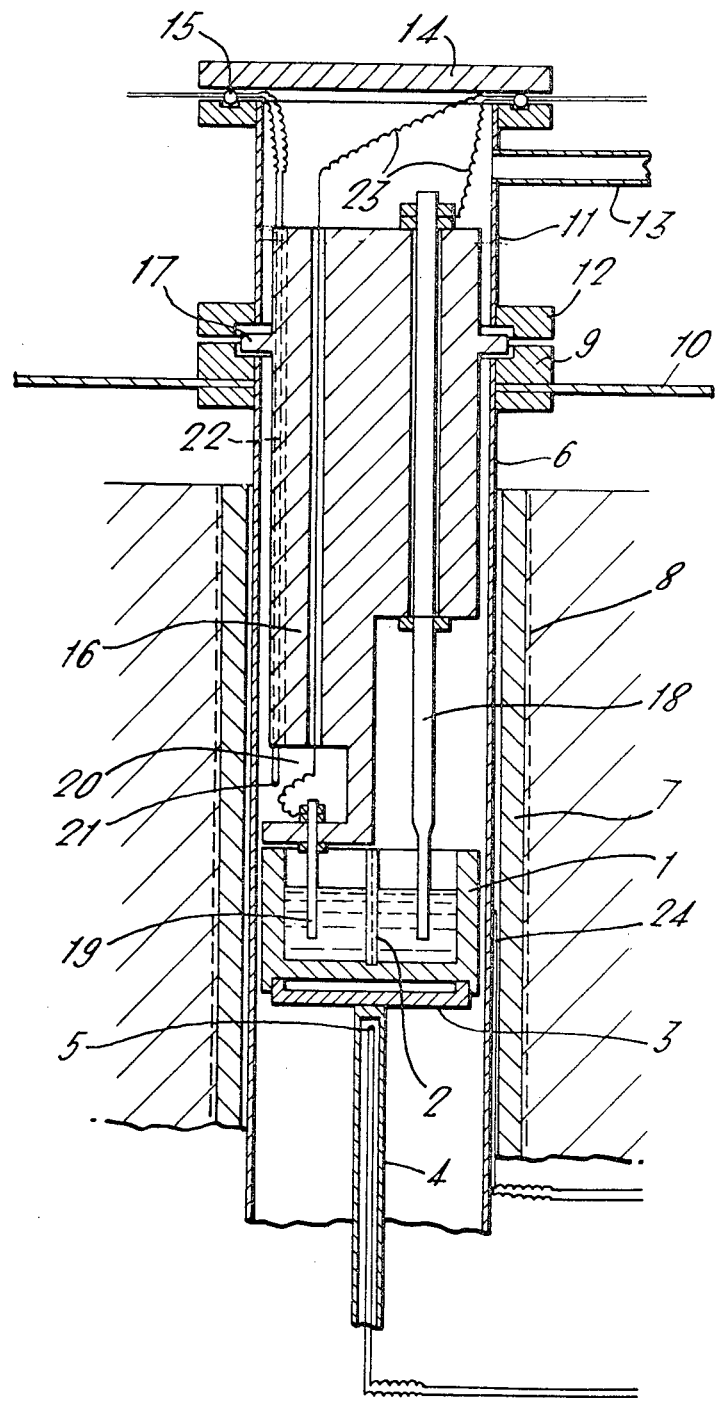

3,523,066
DETERMINATION OF COMBINED CARBON IN METALS
David Rowland Morris, University of New Brunswick, New Brunswick, Canada, and George L. Hawkes, Berlin, Germany, assignors to United Kingdom Atomic Energy Authority, London, England
Filed June 23, 1967, Ser. No. 648,387
Claims priority, application Great Britain, June 23, 1966, 28,239/66
Int. Cl. G01n 27/26, 27/46
U.S. Cl. 204—1                                   3 Claims

ABSTRACT OF THE DISCLOSURE

A method of and apparatus for measuring the dissolved carbon in metals, e.g. steels, comprises setting up the electrochemical cell: metal specimen/salt electrolyte/graphite and measuring the E.M.F. The temperature is such that the metal specimen is solid but the electrolyte (which contains ionised carbon, e.g. calcium carbide) is preferably fused.

BACKGROUND OF THE INVENTION

The present invention relates to the determination of dissolved carbon in metals.

It will be well-known that many metals, e.g. steels, contain a small but very important proportion of carbon. It has been found possible to set up an electrochemical cell to measure the activity of this carbon and so determine the concentration of carbon present and it will be understood that this affords a relatively rapid procedure for analysing for carbon in steels. However, the prior proposals have necessitated operation at temperatures in excess of 1600° C. at which temperature steel is molten.

It is an object of the present invention to provide a process which does not suffer from this disadvantage.

SUMMARY OF THE INVENTION

According to the present invention, a method of measuring the carbon content of a metal comprises setting up the following cell: metal containing carbon/salt electrolyte/graphite; and measuring the electromotive force at a known temperature below the melting point of the metal, the electrolyte containing carbon in an ionised state and having a known carbon potential relative to graphite.

According to a further aspect of the present invention, there is provided apparatus for measuring the carbon content of a metal, comprising a crucible, a solid graphite electrode in such crucible, means to support a second solid electrode made of said metal in said crucible, a salt electrolyte within the crucible and in contact with said two electrodes, such electrolyte containing carbon in an ionised state and having a known carbon potential relative to graphite, and means to measure the potential difference between said electrodes at a known temperature.

Clearly, one or other of the electrodes may constitute the crucible.

The output of the cell of the present invention is given by the formula:

$$E = -\frac{RT}{zF} \log_e a_c$$

wherein:
E is the electromotive force
R is the gas constant
T is the absolute temperature
F is the Faraday equivalent
z is the valency of the carbon ions in the electrolyte
$a_c$ is the activity of the carbon in the metal relative to graphite.

It will be apparent that the carbon activity in the specimen is related to its carbon concentration in a known manner.

It will also be apparent that the output of the cell depends on temperature and therefore it may be desirable to operate with a molten electrolyte but this is not strictly necessary. However the use of a molten electrolyte does ensure good electrical contact between the electrodes and the electrolyte.

In theory, calcium carbide is a suitable electrolyte but since it melts at 2300° C. a solvent is necessary. For steels, calcium chloride is a suitable solvent and the use of a 10 mol percent solution of calcium carbide in calcium chloride permits the measurement of carbon contents of steel above about 0.02% by weight up to about 1200° C.

It is convenient to use very pure calcium chloride which is melted and dried, at a temperature higher than that at which it will be used, in a pure inert gas atmosphere. The calcium carbide is conveniently prepared by reacting pure calcium with graphite in an inert gas atmosphere.

It is important that any free carbon in the electrolyte, whether originally present in the calcium carbide or derived from the graphite electrode, should not come into contact with the metal specimen with which it might react. The cell construction should desirably avoid this.

It should also be realised that the present invention can only be applied to metal/carbon systems in which the carbon potential is higher than in the electrolyte. Suitable systems are iron-carbon, nickel-carbon, magnesium-carbon or sodium-carbon to mention but a few. However, in each case it is necessary to provide a suitable electrolyte.

BRIEF DESCRIPTION OF THE DRAWING

In order that the present invention may more readily be understood, one embodiment of a cell for carrying the same into effect will now be described with reference to the accompanying drawing which is a diagrammatic section.

DESCRIPTION OF THE PREFERRED EMBODIMENT

Referring now to the drawing, the cell proper comprises a nickel crucible 1 which is divided into two compartments by a filter 2 which is a close fit in slots in the crucible base and walls. The filter 2 comprises several layers of 77 micron nickel gauze held in a suitable nickel frame.

The crucible 1 is supported on a base plate 3 carried by a tube 4, this tube also housing a Pt/Pt 13% Rh thermocouple 5. The crucible 1 is housed in an Inconel tube 6 and the tube 6 is sealed at its lower part (not shown) to the tube 4. The tube 6 is located within a quartz furnace tube 7 which is in turn surrounded by furnace windings 8. At its upper end the tube 6 is mounted, by means of a collar 9, on a support plate 10.

An upper tube 11 is also provided and has a collar 12 at its lower end to engage the collar 9, this tube 11 being provided with a gas off-take pipe 13, and being sealed by a cover plate 14 and O-ring 15 so that the cell assembly can be evacuated through the pipe 13.

A pyrophyllite support member 16 has a flange 17 which is located in a groove between the two collars 9, 12. At its lower end, this support member 16 is cut-away to prevent the electrolyte forming a bridge between a graphite electrode 18 and an unknown steel electrode 19 both carried by the support member 16. The graphite electrode 18 is housed in a long bore in the support member 16 and its upper end is located in the tube 11. The steel electrode 19 is relatively short and its upper end is housed in a small recess 20. This recess 20 also houses a second Pt/Pt 13% Rh thermocouple 21 the leads from which pass up through a bore 22 in the support member 16 and out through the O-ring 15. Platinum leads 23 from the two electrodes also pass out through the O-ring 15 and are taken to a vibrating-reed electrometer having an internal impedance of the order of $10^{15}$ ohms.

The temperature of the furnace is controlled by a thermocouple 24 located between the Inconel tube 6 and the quartz tube 7. The thermocouples 5 and 21 are used to measure the temperature of the cell.

In an experiment using the above described apparatus the following results were obtained.

| Temperature, ° C.: | E.M.F., M.V. | Carbon activity |
|---|---|---|
| 907 | 81 | 0.452 |
| 845 | 52 | 0.584 |
| 795 | 40 | 0.650 |

Calculations shows that these carbon activities correspond to carbon contents in the range 0.6 to 0.7 percent by weight. Chemical analysis showed the sample of steel being used to contain 0.73% carbon by weight.

We claim:

1. A method of measuring the dissolved carbon content of a metal comprising: providing a primary galvanic cell having a carbon-containing metal as one electrode and graphite as the other electrode, and having an electrolyte connecting the electrodes which is a salt containing carbon ions; measuring the electromotive force generated between the electrodes at a temperature below the melting point of the metal, and utilizing said measurement to determine the dissolved carbon content of said carbon-containing metal.

2. A method according to claim 1, wherein the measurement is effected at such a temperature that the salt electrolyte is molten.

3. A method according to claim 1 wherein the salt electrolyte is calcium carbide in solution in calcium chloride.

References Cited
UNITED STATES PATENTS

| 2,531,747 | 11/1950 | Stearn | 204—195 |
| 2,833,704 | 5/1958 | Wainer | 204—64 |
| 2,920,021 | 1/1960 | Ueltz | 204—64 |
| 3,324,013 | 6/1967 | Dewing | 204—195 XR |
| 3,403,090 | 9/1968 | Tajiri et al. | 204—195 |
| 3,428,532 | 2/1969 | Banks | 204—1 |

ROBERT K. MIHALEK, Primary Examiner

G. L. KAPLAN, Assistant Examiner

U.S. Cl. X.R.

324—29, 30, 71